Figure 1:
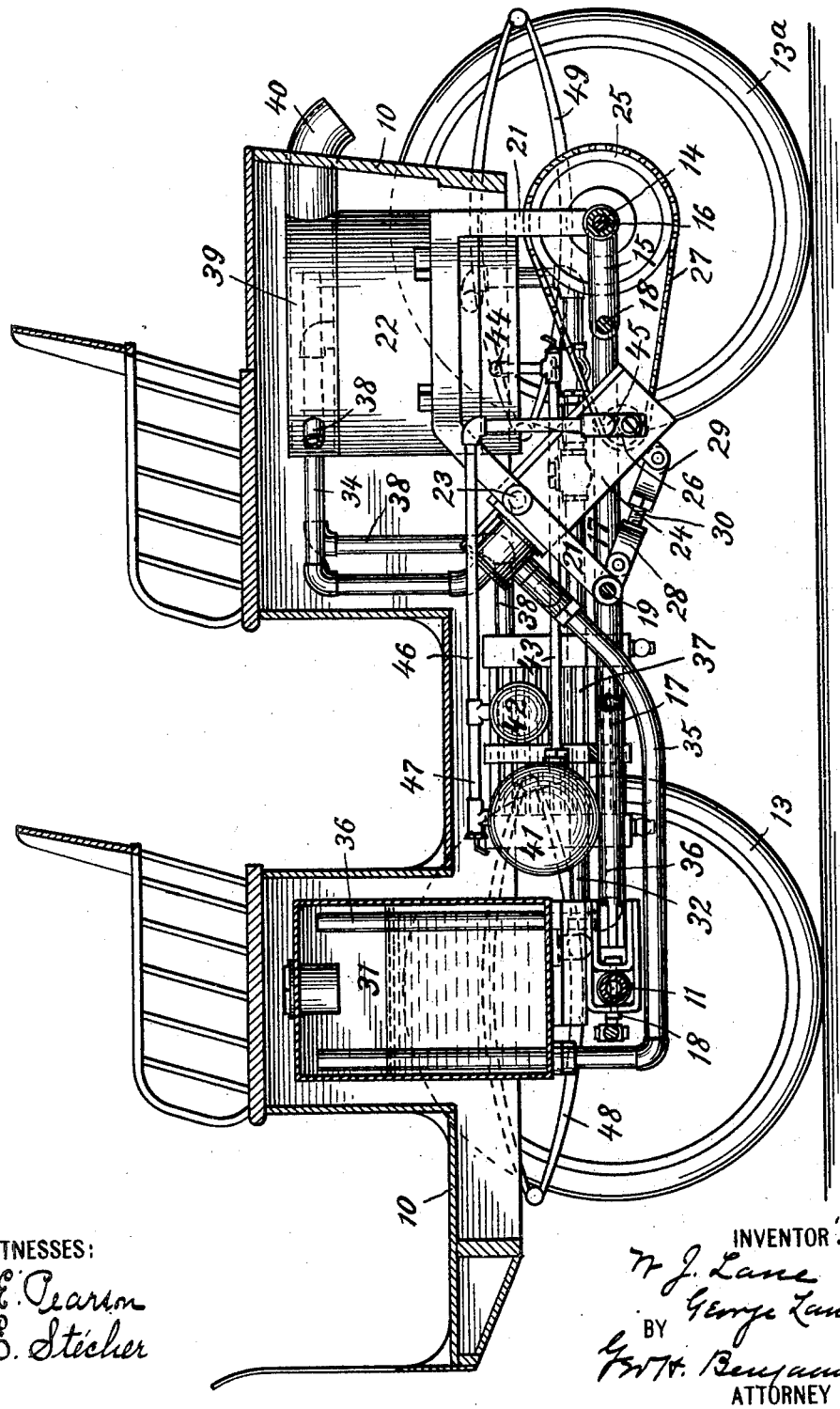

No. 690,162. Patented Dec. 31, 1901.
W. J. & G. LANE.
MOTOR VEHICLE.
(Application filed May 8, 1901.)
(No Model.) 2 Sheets—Sheet 1.

WITNESSES:
J. E. Pearson
C. E. Stecher

INVENTOR'S
W. J. Lane
George Lane
BY
G. H. Benjamin
ATTORNEY

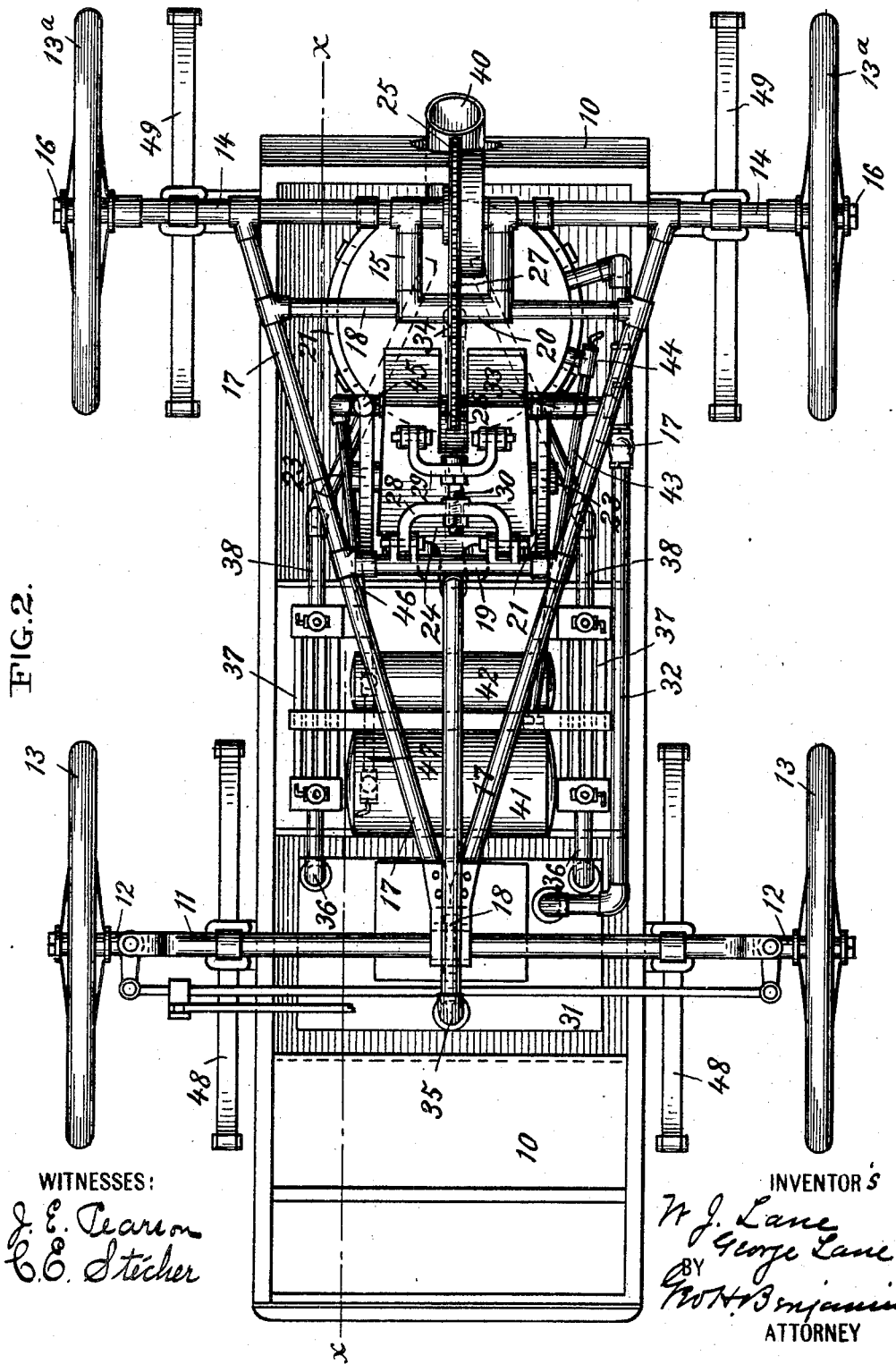

UNITED STATES PATENT OFFICE.

WILLIAM JAMES LANE AND GEORGE LANE, OF POUGHKEEPSIE, NEW YORK, ASSIGNORS TO THE LANE MOTOR VEHICLE COMPANY, A CORPORATION OF NEW JERSEY.

MOTOR-VEHICLE.

SPECIFICATION forming part of Letters Patent No. 690,162, dated December 31, 1901.

Application filed May 8, 1901. Serial No. 59,329. (No model.)

*To all whom it may concern:*

Be it known that we, WILLIAM JAMES LANE and GEORGE LANE, citizens of the United States, residing at Poughkeepsie, county of Dutchess, State of New York, have invented certain new and useful Improvements in Motor-Vehicles, of which the following is a specification.

Our invention relates to motor-vehicles of the type adapted to be operated by steam.

Our invention consists in a construction wherein the means employed for generating and applying power are carried wholly upon the running-gear frame of the vehicle and entirely independent of the body of the vehicle.

The object of our invention is to make the body of the vehicle and the running-gear power generating and applying mechanism entirely independent of each other except when combined as a vehicle. Different shapes of bodies intended for different uses may be employed with the same running-gear power generating and actuating mechanism, or, conversely, two or more identical running-gear power generating and actuating mechanism may be used at different times with the same body. For instance, in the first case we may make two different forms of bodies, one as a pleasure vehicle and the other for business purposes, and use both of these bodies at different times with the same running-gear power generating and actuating mechanism, or, in the second case, with a given form of body we may duplicate the running-gear power generating and actuating mechanism, holding one in reserve in case of accident.

The accompanying drawings will serve to illustrate our invention, in which—

Figure 1 is a vertical section, taken through the body of a motor-vehicle on the line X X of Fig. 2. The water-tank is likewise shown in section, with the other parts in elevation. Fig. 2 is a plan view.

In the drawings, 10 represents the body of a motor-vehicle. The body shown in the drawings is that commonly known as a "surrey." In place of using this form of body—adapted for pleasure purposes—we may use a body such as is common with delivery-wagons or any other form of a body for either pleasure or business.

The running-gear of the vehicle consists of the forward member 11, on the ends of which are pivotally mounted the axles 12, carrying the forward wheels 13.

14 represents the rear member, which is tubular and turned horizontally forward at its center to form the rectangular portion 15. Situated within the tubular member 14 is an axle 16, to the ends of which are secured, so as to be rotated by the axle, the rear wheels 13ª. The forward member 11 and rear member 14 are connected together by the reaches 17, which converge from the rear member 14 toward the forward member 11. The reaches are rigidly secured to the member 14 and pivotally connected at 18 to the forward member 11, the pivot being so disposed as to permit vertical oscillation of the forward member 11 relative to the pivot.

The reaches 17 are connected together by means of the transverse braces 18 and 19. The brace 18 is carried through the transverse member 20 of the rectangular portion of the rear member 14. Mounted on the reaches 17 are the vertical frame-plates 21. These plates are curved outward to conform to the shape of the boiler 22, which they support. Pivoted at 23 in the inclined portion of the frame-plates 21 is a steam-engine 24.

Mounted upon the axle 16 is a sprocket-wheel 25. Interposed between the driving-shaft 26 of the engine 24 and the sprocket-wheel 25 is a sprocket-chain 27. Any other device for transmitting the power of the engine to the driving-axle may be used.

In order to take up any slack which may be due to wear in the sprocket-chain, the engine 24 is arranged to have its angular inclination relative to the frame altered. This is accomplished by means of the pivoted bails or bearings 28 29, respectively, connected one to the brace 19 and one to the engine-frame 24 and secured together by means of the adjustable screw 30.

It will be observed that by reason of the pivotal position of the engine the power-shaft of the engine is brought close to the driving-axle, and hence but a very short sprocket-chain is required, which is a point of considerable advantage in vehicles of this description.

Mounted on the front of the reaches 17 and over the front member 11 is a water-tank 31. This tank is connected with the boiler 22 through a pipe 32.

33 represents a steam-pump actuated by the engine and interposed in the pipe 32 between the boiler and water-tank.

34 indicates live-steam pipe from boiler to engine; 35, exhaust-pipe from engine to interior of water-tank; 36, pipes on opposite sides of water-tank and communicating with the interior of the surface condensers 37; 38, pipes extending from the outlet of the condensers and discharging into a horizontal flue 39, located over the boiler 22; 40, an escape-flue for the products of combustion and any uncondensed steam which passes the water-tank and condensers.

Located just to the rear of the water-tank 31 is a fuel-tank 41 and to the rear of the fuel-tank an air-reservoir 42.

43 is a fuel-supply pipe leading from the fuel-tank 41 to the burner-injector 44; 45, an air-pump operated by the engine; 46, a pipe leading from the air-pump to air-reservoir 42; 47, a pipe leading from top of air-reservoir to fuel-tank 41.

48 and 49 represent springs mounted on the front and rear members 11 and 14. The body 10 is mounted upon these springs.

It will be observed from the construction described that all the power generating and actuating mechanism is mounted upon the running-gear frame and moves with the frame and is entirely independent of the body of the vehicle. Further, that movement of the body may take place on its springs entirely independent of the movement of the running-gear frame and the mechanism supported by it.

In constructing the body, whatever may be its general contour, we prefer that it shall contain receptacles within it, such as are shown, for inclosing and partially hiding the power generating and actuating mechanism.

We have shown the power generating and actuating mechanism in this application as occupying a fixed relation relative to the vehicle-frame. Manifestly, if desired, all of such parts could be elastically suspended upon the frame through the instrumentality of springs without in any wise altering the general relation of the parts shown, especially the relation existing between the frame and the vehicle-body.

We wish it understood that we do not limit ourselves to the precise construction shown in the drawings and described in the specification, as various modifications may manifestly be made without in any respect departing from the intent of our invention.

We have not entered in this specification into any description of the method of operation of the various parts forming the power generating and actuating mechanism, as the same has been fully described in other applications heretofore filed by us.

Having thus described our invention, we claim—

1. In combination with a vehicle-frame, a motor device pivoted in said frame and in such a manner that its longitudinal axis will form an obtuse angle with the longitudinal axis of the frame, and means interposed between said motor device and frame for adjusting the angular inclination of the motor device relative to the frame.

2. In combination with the reaches and rear member of a vehicle-frame, of vertical side plates, a boiler carried by said side plates and a motor device pivoted in said side plates.

3. In combination with the reaches of a vehicle-frame, side plates, a motor pivoted in said side plates, a transverse brace connecting the reaches, pivoted bails, one connected to the transverse brace and the other to the motor-frame, and means between said pivoted bails for adjusting the distance between said bails.

In testimony whereof we affix our signatures in the presence of two witnesses.

WILLIAM JAMES LANE.
GEORGE LANE.

Witnesses:
J. E. PEARSON,
C. E. STECHER.